UNITED STATES PATENT OFFICE.

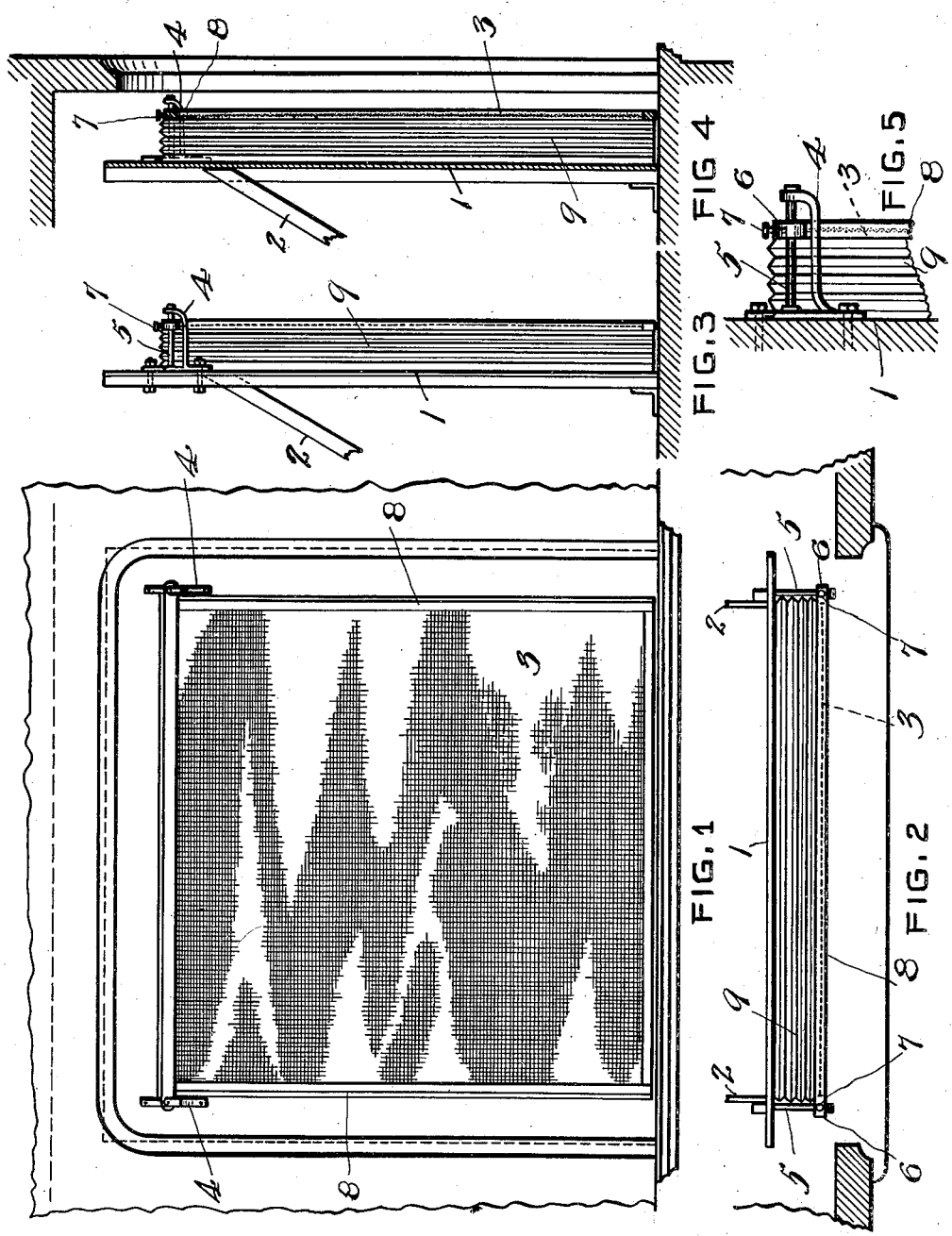

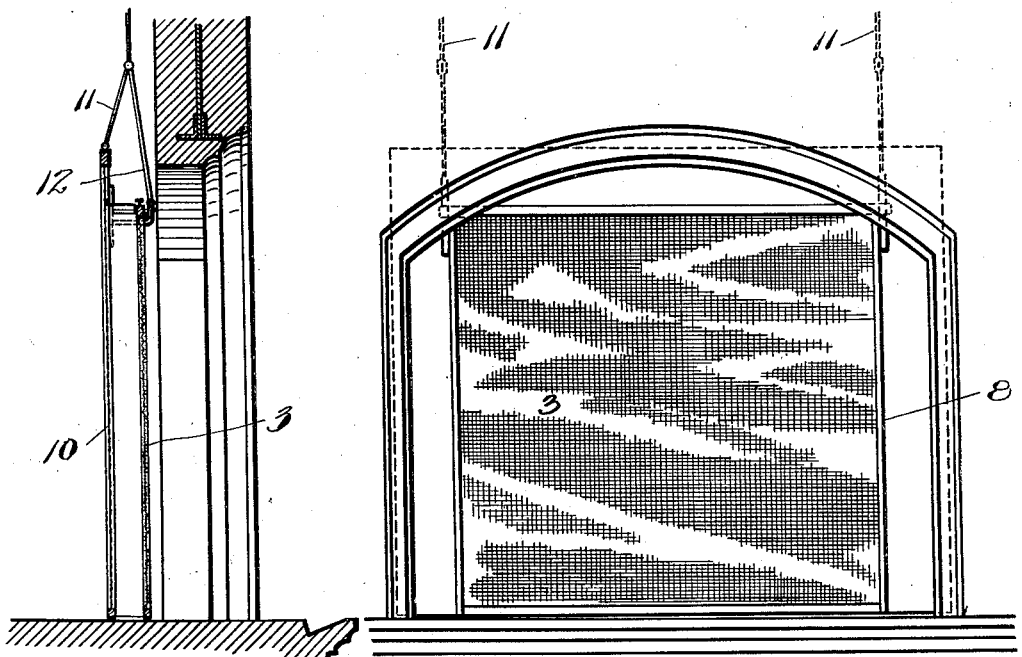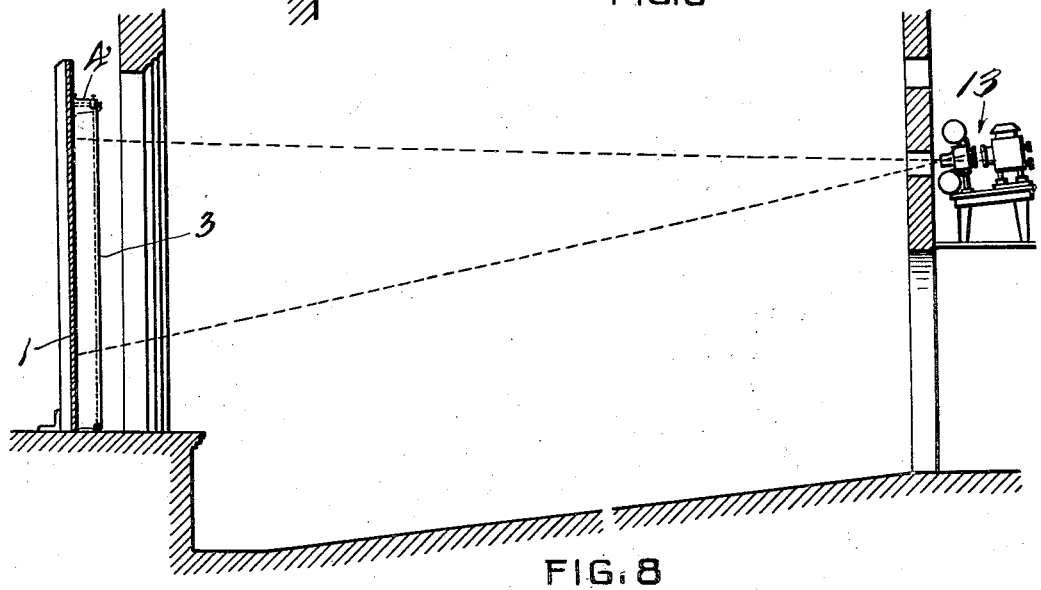

GEORGE W. SMITH AND WILLIAM B. THOMAS, OF COLUMBUS, OHIO.

PICTURE-MACHINE.

1,031,879.  Specification of Letters Patent.  Patented July 9, 1912.

Application filed May 25, 1911. Serial No. 629,424.

*To all whom it may concern:*

Be it known that we, GEORGE W. SMITH and WILLIAM B. THOMAS, citizens of the United States, residing at 698 Neil avenue and 180 East State street, respectively, Columbus, in the county of Franklin and State of Ohio, have invented certain new and useful Improvements in Picture-Machines, of which the following is a specification.

Our invention relates to improvements in apparatus for displaying projected pictures, and is designed for use in connection with moving picture machines, stereopticons, magic lanterns, etc.

The object of the invention is to provide in connection with the receiving surfaces of projected pictures or images, means for overcoming certain objectionable defects as eliminating the flicker which is present in many projected pictures when a moving picture machine is used, and obliterates the effects on the picture of wrinkles, scratches, or cracked films. In addition to overcoming these objectionable features, our invention brings out the detail of the picture into bolder relief, gives new life to pictures from worn films, and brings out more clearly the high lights of the projected picture.

The invention consists essentially in placing a translucent non-light-diffusing screen in front of the picture receiving surface in such position that the light rays emanating from the picture machine may pass through the translucent screen and onto the receiving surface. The translucent screen and its attendant details of construction will be more fully described in the following specification.

In the drawings we have illustrated one example of the physical embodiment of our invention, and shown two forms of adapting it for use. These constructions exemplify the best modes we have so far devised for the practical application of the principles, and have proven eminently satisfactory in actual use.

Figure 1 is a front elevation of a moving picture theater stage, showing the embodiment of our invention. Fig. 2 is a plan view of Fig. 1. Fig. 3 is an end elevation showing the light or picture receiving surface or "curtain," with our translucent non-light-diffusing screen in place. Fig. 4 is a vertical sectional view of Fig. 1. Fig. 5 is an enlarged detail view. Fig. 6 is a front elevation of a theater stage employing a drop curtain, with which our invention is equipped. Fig. 7 is a vertical sectional view of Fig. 6. Fig. 8 illustrates the manner of using the invention in connection with a picture machine.

In Figs. 1 to 5, and 8, we have illustrated the picture receiving surface, well known as a "curtain," in the form of a stationary upright frame 1 of usual construction, and braced or supported by the braces 2. The screen 3, which as before mentioned is translucent and non-light-diffusing, may be of silk or wire, as desirable, with a woven mesh of approximately $\tfrac{3}{16}''$, but it will be understood that we determine the fineness of the mesh dependent upon the conditions existing. The location and position of the screen with reference to the "curtain" depends upon the size of the auditorium, the lighting, and especially the distance at which the picture machine is located from the curtain. For this required adjustment as to the space between the "curtain" and "screen" we locate a supporting bracket 4, at each of the upper corners of the curtain 1 and form the bracket with a projecting rod 5, upon which rods the sleeves 6, 6, are adapted to slide. Set screws 7, 7, are employed to secure the sleeves in adjusted position on the rod. The sleeves are carried by the frame 8 of the screen, and movement of the screen toward or away from the curtain is thus effected. A light proof covering 9 at the top and sides of the screen, is attached to both the screen frame and the curtain. This covering provides an inclosed dark space immediately in front of the curtain, by shutting out all foreign light coming from the stage, or other places. The covering is composed of suitable flexible material, and to further adapt it for convenient use we preferably shape it into accordion plaits.

For differing commercial uses the translucent screen, brackets and light-proof covering, may also be attached to a drop curtain 10, as in Figs. 6 and 7. The curtain as here illustrated is suspended from the flies of the stage by ropes 11, and the screen in addition to being supported on the curtain, is provided with an attaching rope 12.

The operation of the apparatus is illustrated in Fig. 8, wherein the light rays emanate from the moving picture machine 13, and pass through the screen and are projected onto the receiving and reflecting surface of the curtain, as shown by dotted lines. Under some conditions we may use a plurality of screens when found desirable, but it will be understood that in all cases the light rays pass through the screens and are projected onto the reflecting surface.

From actual practice we have found that the desirable features set forth as the objects of our invention are accomplished, and the objectionable features referred to have been eliminated.

Having thus fully described our invention, what we claim as new and desire to secure by Letters Patent is:—

1. The combination with a light-receiving surface, of a translucent non-light-diffusing screen located in front of said surface in the path of the projected light rays and forming a space between the curtain and screen.

2. The combination with a curtain for receiving projected images, of a translucent non-light-diffusing screen in front of said curtain, and a light-proof covering attached to the curtain and screen and inclosing a space between the curtain and screen.

3. The combination with a light-receiving curtain, of a translucent non-light-diffusing screen, a supporting bracket on the curtain for the screen, and a light-proof covering inclosing the space between the curtain and screen.

4. The combination with a light-receiving surface, of a translucent non-light-diffusing screen in front of said surface, a supporting bracket for the screen and a light-proof, accordion plaited, extensible covering inclosing the space between the surface and screen.

5. The combination with a light-receiving curtain, and a translucent non-light-diffusing screen in front of the curtain, of a supporting bracket on the curtain for the screen, and an extensible light-proof covering inclosing the space between the curtain and screen.

6. The combination with a light-receiving curtain, and a translucent non-light-diffusing screen in front of the curtain, of a supporting bracket on the curtain, adjustable sleeves on the bracket, and a light-proof, extensible, covering suspended from said sleeves and inclosing the space between the curtain and screen.

In testimony whereof we affix our signatures in presence of two witnesses.

GEORGE W. SMITH.
WILLIAM B. THOMAS.

Witnesses:
C. M. SHIGLEY,
HAROLD R. LAKIN.